UNITED STATES PATENT OFFICE.

ADOLF KUCHENBECKER, OF HÖCHST-ON-THE-MAIN, GERMANY, ASSIGNOR TO FARBWERKE VORM. MEISTER LUCIUS & BRÜNING, OF HÖCHST-ON-THE-MAIN, GERMANY, A CORPORATION OF GERMANY.

YELLOW AZO DYE.

No. 839,605.      Specification of Letters Patent.      Patented Dec. 25, 1906.

Application filed February 28, 1906. Serial No. 303,517. (Specimens.)

*To all whom it may concern:*

Be it known that I, ADOLF KUCHENBECKER, Ph. D., chemist, a citizen of the Empire of Germany, residing at Höchst-on-the-Main, Germany, have invented certain new and useful Improvements in Yellow Azo Dyestuffs, of which the following is a specification.

I have found that yellow azo dyestuffs distinguished by their shade and fastness may be obtained by combining diazotized meta-xylidin-ortho-sulfonic acid with pyrazolone-sulfonic acids, the constitution of which corresponds with the formula

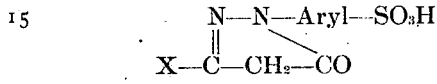

(wherein X means methyl or carboxyl).

The new dyestuffs are yellow compounds readily soluble in water. The color of their solution is not changed by alkalies or acids. In concentrated sulfuric acid they dissolve with a yellow color and are decomposed by reduction with tin and hydrochloric acid, with formation of meta-xylidin-ortho-sulfonic acid, besides a derivative of pyrazolone-sulfonic acid.

The dyestuffs dye wool in yellow shades fast to light.

The manufacture of these new dyestuffs may be carried out, for instance, as follows: 20.1 kilos of meta-xylidin-ortho-sulfonic acid are dissolved with sodium carbonate and diazotized by adding 6.9 kilos of nitrite and thirty kilos of concentrated hydrochloric acid. The diazo compound is then introduced into a solution of 28.4 kilos of 1-para-sulfophenyl-5-pyrazolone-3-carbonic acid ($C_6H_4SO_3H:COOH:O = 1:3:5$) and thirty kilos of calcined soda. After stirring for several hours the whole is heated to about 70° centigrade, and the dyestuff is then isolated by adding hydrochloric acid and common salt. Filtered and dried it is a yellow powder readily soluble in water and dyeing wool greenish-yellow shades.

The solution of the dyestuff in concentrated sulfuric acid is yellow. On heating with tin and concentrated hydrochloric acid the dyestuff yields meta-xylidin-ortho-sulfonic acid and a derivative of pyrazolone, which derivative becomes violet when treated with ferric chlorid. It dyes wool greenish yellow.

Having now described my invention, what I claim is—

1. The new azo dyes which when filtered and dried are yellow powders yielding when reduced with tin and hydrochloric acid meta-xylidin-ortho-sulfonic acids and derivatives of pyrazolone-sulfonic acids the constitution of these latter corresponding to the formula:

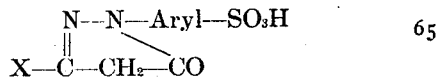

(wherein X means methyl or carboxyl), being readily soluble in water with a yellow color not changed by alkalies or acids, soluble also in concentrated sulfuric acid with a yellow color and dyeing wool yellow shades fast to light.

2. The new azo dye which when filtered and dried is a yellow powder yielding when reduced with tin and hydrochloric acid meta-xylidin-ortho-sulfonic acid and a derivative of 1-para-sulfophenyl-5-pyrazolone-3-carbonic acid, being readily soluble in water with a yellow color not changed by alkalies or acids; soluble also in concentrated sulfuric acid with a yellow color and dyeing wool greenish-yellow shades fast to light.

In testimony that I claim the foregoing as my invention I have signed my name in presence of two subscribing witnesses.

ADOLF KUCHENBECKER.

Witnesses:
    JEAN GRUND,
    CARL GRUND.